Oct. 16, 1962 J. A. COOLEY 3,059,199

MINIATURIZED POTENTIOMETER

Filed Nov. 7, 1961 3 Sheets-Sheet 1

John A. Cooley,
*INVENTOR.*

BY S. J. Rotondi
A. T. Dupont
Julian W. Dority

Oct. 16, 1962 J. A. COOLEY 3,059,199

MINIATURIZED POTENTIOMETER

Filed Nov. 7, 1961 3 Sheets-Sheet 2

John A. Cooley,
INVENTOR.

BY S. J. Rotondi
A. T. Dupont
Julian W. Dority

John A. Cooley,
INVENTOR.
BY S. J. Rotondi
A. T. Dupont
Julian W. Dority

United States Patent Office 3,059,199

Patented Oct. 16, 1962

3,059,199

MINIATURIZED POTENTIOMETER

John A. Cooley, 6505 Walnutt Road, Bethesda, Md.

Filed Nov. 7, 1961, Ser. No. 150,849
4 Claims. (Cl. 338—163)
(Granted under Title 35, U.S. Code (1952), sec. 266)

The invention described herein may be manufactured and used by or for the Government for governmental purposes without the payment of any royalty thereon.

This invention relates to potentiometers, and in particular to an improved miniaturized potentiometer.

In the present state of the art, potentiometers occasionally are made with the resistance element within a knob. At present, however, these devices require several holes in the chassis where they are to be used, in order to provide passage for the conductors. The several holes required, and the expense of drilling them accurately increases considerably the cost of using such devices. Furthermore, some devices depend on gravity-actuated mercury contacts, and cannot be tilted or tipped.

Miniaturized electronic equipment is becoming more and more common as the electronic industry advances. The reduction in size of potentiometers permits an increase in complexity and usefulness of much equipment, and in particular, test equipment such as signal generators, oscilloscopes, etc., where portability is often a factor.

With some components, however miniaturization decreases reliability and ruggedness. This is especially true in the case of potentiometers, where a decrease in size results in a decrease in dissipation capability and a more delicate physical structure. It should be noted, however, that while the potentiometer body itself may be miniaturized, the knob whereby the potentiometer shaft is grasped for turning must be of a certain minimum size in order to permit a sufficient grip by the fingers.

Therefore, an object of this invention is to provide a gravity-independent potentiometer.

It is another object of this invention to provide a potentiometer of extreme ruggedess, and simplicity of design.

It is a further object of this invention to provide a potentiometer suitable for use with miniaturized equipment where a minimum amount of internal space is consumed, and that requires only one mounting hole in an electronic chassis.

This invention will be better understood by reference to the following specification, taken in conjunction with the following figures, in which.

The potentiometer comprises a tubular shaft on which a knob or casing is rotatably mounted. A variable resistance means is enclosed within said knob which bears a resistance element and a contact member. A plurality of conductive elements are connected to the variable resistance means and extend through said tubular shaft so as to enable the device to be mounted on a chassis through a single aperture.

Figure 1:
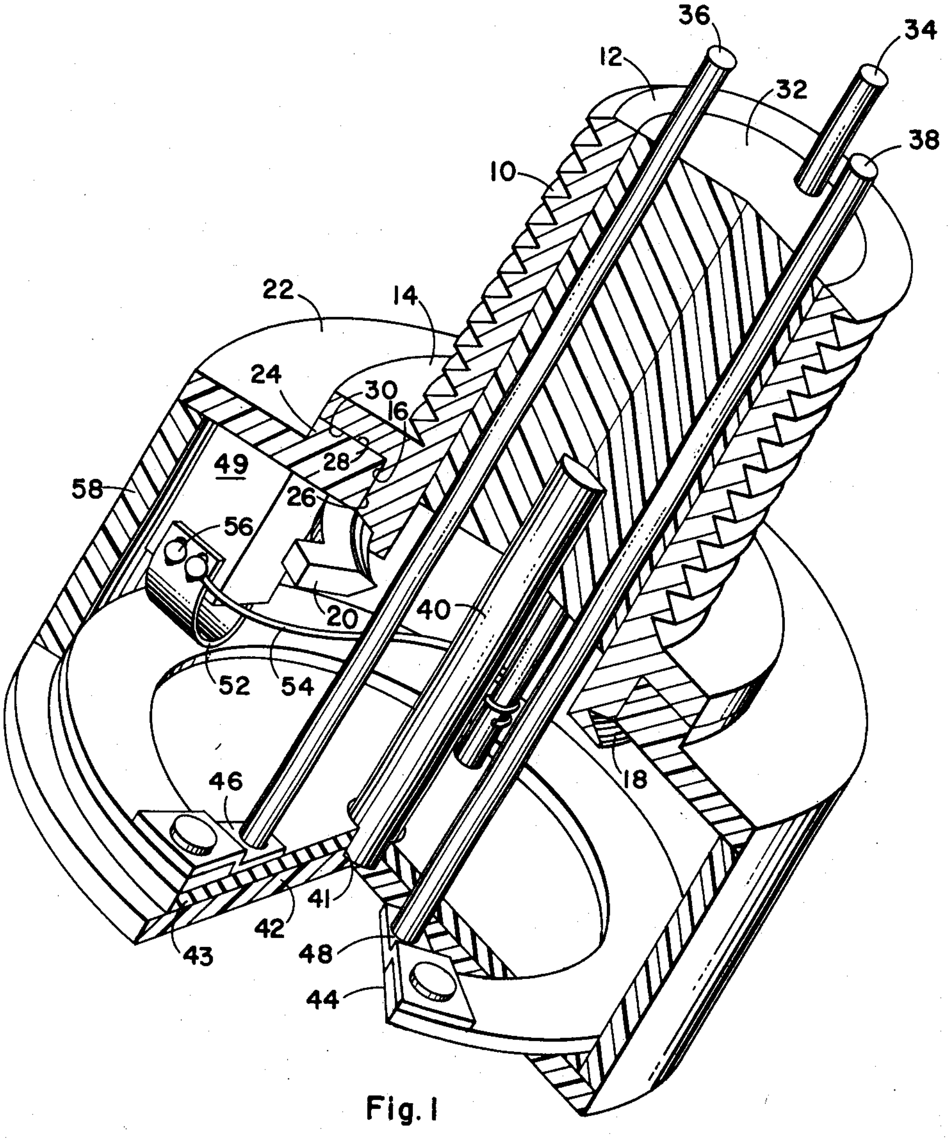
FIGURE 1 is a perspective view, partly in section, of a preferred form of the invention.

FIGURE 1 shows a miniaturized potentiometer comprising: a tubular shaft 12 having an outer threaded portion 10, a flange 14 at one end of portion 10, an outer bearing surface 16 adjacent flange 14, and an annular groove 18 disposed for mating with a flat, circular back support member 22. Member 22 is provided with a raised ring 24 that has an internal bearing surface 26 which mates with bearing surface 16 on shaft 12, and a flat bearing surface 28, which mates with a flat bearing surface 30 that comprises part of flange 14. Back support member 22 is held in a rotatable relationship with shaft 12 by means of flange 14 and a retaining ring 20 which abuts member 22. Tubular shaft 12 is filled with an insulating potting compound 32 which rigidly fixes the conductive support rods 34, 36, and 38 as well as one end of a support shaft 40 within tubular shaft 12. The other end of support shaft 40 is positioned in a bore 41 of a front cover 42 which is made of insulating material and that is disposed for rotation on support shaft 40. Support shaft 40 can be made of conductive or insulating material, however, in the preferred embodiment it is made of insulating material.

Front cover 42 supports a disc 43 on which a generally circular or arcuate resistance element 44 is attached. Resistance element 44 may be either wire wound or of a composition, such as carbon and clay, as is commonly used in potentiometers. Connected to each end of the resistance element 44, are conductive contacting straps 46 and 48, which are connected to conductive support rods 36 and 38 that serve as electrical connectors to the resistance element. In order to provide a third contact, a movable element 49 is attached to the back support member 22 and has a spring contact 52 which is connected through a flexible wire 54 to conductive support rod 34 and to the resistance element 44 by its own natural resilience. The connection of the spring to block 49 is accomplished by a pair of support fasteners 56 which allows a slight flexible movement of one end of the spring 52 while the other end of spring 52 remains firmly fixed to the block. Surrounding the entire assembly is an outside cover 58, that is fastened to member 22 by any suitable means such as an adhesive substance, and may be adapted for gripping. This cover also serves as an adjustment knob for the potentiometer.

Figure 3:
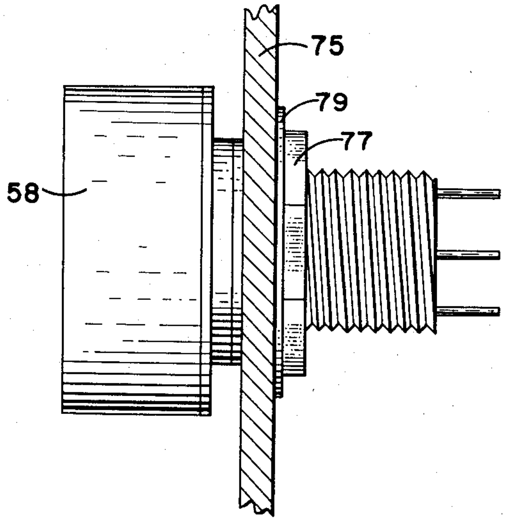
FIGURE 3 is an elevational view showing the potentiometer mounted in a panel.
Figure 4:
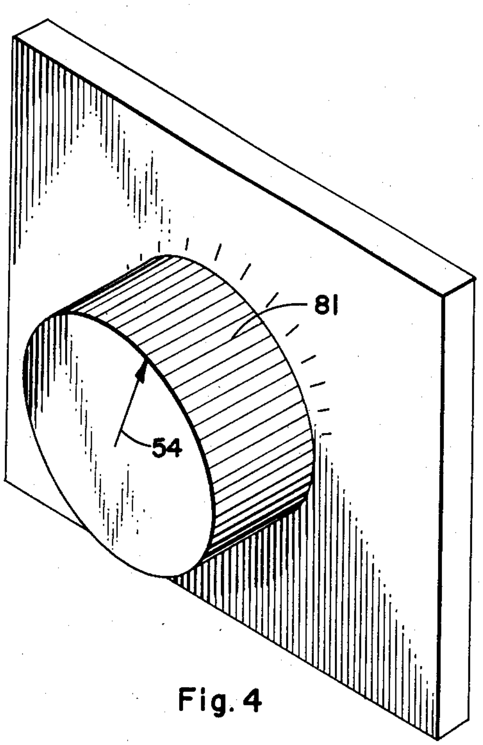
FIGURE 4 is a perspective view showing the mounting panel and the potentiometer knob.

The operation of the device shown in FIGURE 1 is such that when the potentiometer is mounted in a panel 75 by means of a nut and washer 79 (FIGURE 3) and its knob is rotated on the tubular shaft, the spring contact 52 slides along the stationary resistive element 44 and varies the potential between the conductive support rod 34 and one of the other conductive support rods 36 or 38. This potential depends on the manner in which the device is connected in an electrical circuit. During this rotation the resistive element 44 is held stationary by the conductive support rods 36 and 38 and the disc **4*b***.

Figure 2:
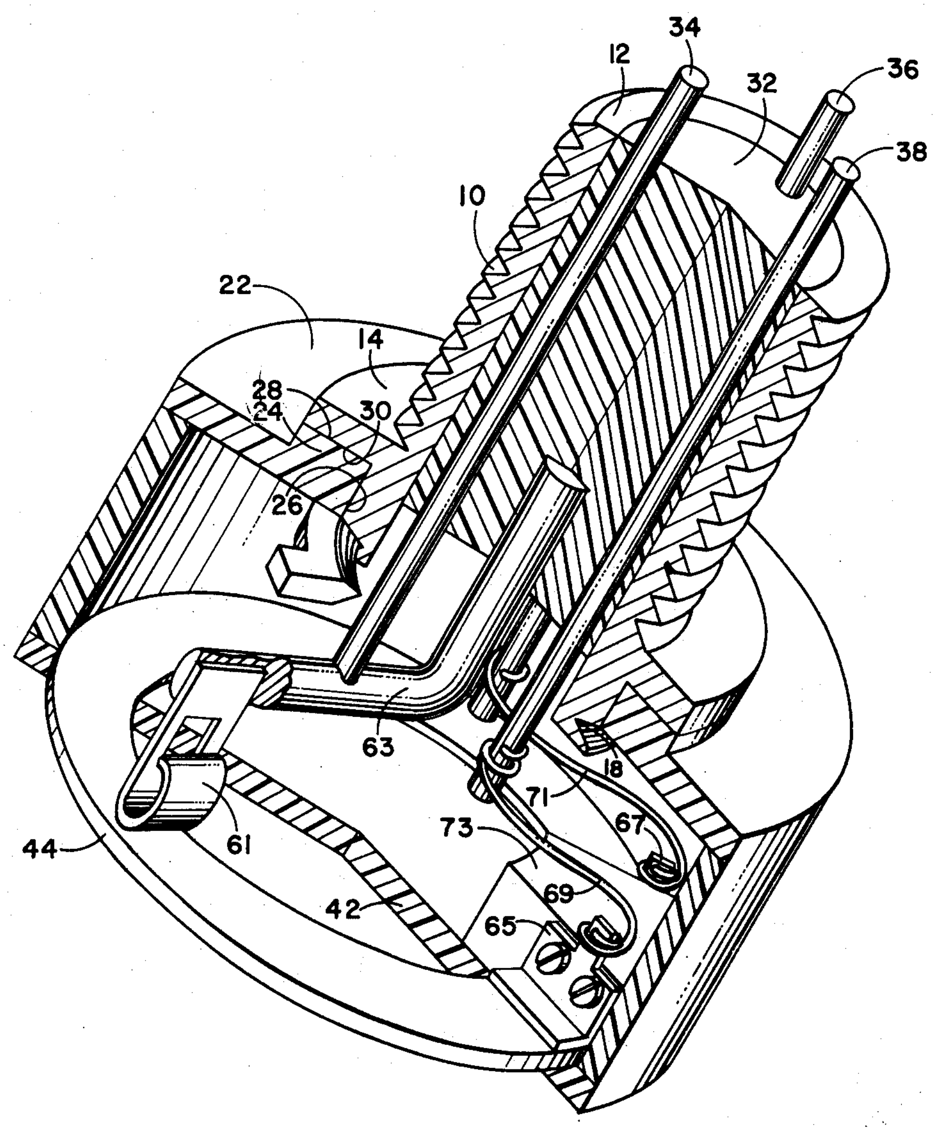
FIGURE 2 is a perspective view, partly in section, of an alternate form of the invention.

FIGURE 2 shows an alternate form of the invention, in which sliding contact spring 61 is stationary, and is supported by a conductive central support member 63, which in turn is connected to support conductor 34. The resistance element 44 is solidly fixed to the front cover 42 so that when the knob rotates the resistance element 44 will rotate. A block 73, made of insulating material, is connected to front cover 42. Each side of this block is provided with a conductive strap 65 or 67. The conductive straps are electrically connected to the ends of the resistance element and to a conductive support rod 36 and 38 by wires 69 and 71 respectively.

The operation of the device shown in FIGURE 2 is such that when, the potentiometer is mounted in the same manner as in the operation of FIGURE 1, and the knob is rotated on the tubular shaft 12, the spring contact 61 remains stationary and the resistance element 44, and conductive straps 65 and 67 rotates with the knob. This rotation varies the potential between the conductive support rod 34 and one of the other conductive support rods 36 or 38, depending on the manner in which the device is connected in an electrical circuit.

The principle of the invention explained in connection with specific exemplifications thereof will suggest many other applications and modifications of the same. It is accordingly desired that, in construing the breath of the appended claims, they shall not be limited to the specific details shown and described in connection with exemplications thereof.

I claim:

1. A miniaturized potentiometer comprising: a tubular shaft having threads, a flange adjacent to one end of said threads, a bearing surface disposed on one side of said flange and an annular groove adjacent said bearing surface; a casing rotatably attached to said tubular shaft between said annular groove and said flange, said casing comprising a front cover, an outside cover and a back support member; a retaining means in said groove to maintain said casing flush against said flange; an arcuate resistive element enclosed within said casing; a plurality of conductive support rods connected to opposite ends of said resistive element and extending through the center of the tubular shaft; a block attached to the back support member of said casing; a spring contact mounted on said block; means for adjusting said spring contact to maintain it in contact with said resistive element; an additional conductive rod extending through said tubular shaft; means for making electrical connection between said spring contact and said additional conductive rod; an insulating potting compound within said tubular shaft and enclosing the conductive support rods, whereby when the casing is rotated the resistive element will remain stationary and the spring contact will slide along said resistive element.

2. A miniaturized potentiometer comprising: a tubular shaft having threads, a flange adjacent to one end of said threads, a bearing surface disposed on one side of said flange, and an annular groove adjacent said bearing surface; a knob rotatably attached to said tubular shaft between said annular groove and said flange, said knob comprising a front cover, an outside cover and a back support member; retaining means in said groove for maintaining said knob flush against said flange; an arcuate resistance element enclosed within said knob and securely attached to the front cover; an insulating block attached to said knob and located between the ends of the resistance element; two conductive support rods extending through said tubular shaft; means for making electrical connection between the ends of the resistance element and said two conductive support rods; a conductive support member enclosed within said knob and extending into said tubular shaft; a spring contact attached to said conductive support member and in electrical contact with said resistance element; a third conductive support rod extending through said tubular shaft and in electrical connection with said spring contact via said conductive support member, whereby when the knob is rotated the resistance element will rotate and slide over the spring contact which is held stationary by the conductive support member.

3. A potentiometer as set forth in claim 2, further comprising: a potting compound enclosed in said tubular shaft, said potting compound firmly fixing said conductive support rods and said conductive support member within said tubular shaft.

4. A miniaturized potentiometer comprising: a tubular shaft; a casing rotatably attached to said tubular shaft, said casing comprising a front cover, an outside cover and a back support; an arcuate resistive element enclosed within said casing; two conductive support rods connected to opposite ends of said resistive element and extending through the center of said tubular shaft; a spring contact member mounted on the back support of said casing and in electrical contact with said resistive element; a third conductive rod extending through said tubular shaft; an electrical connection between said spring contact and said third conductive rod; and a potting compound disposed within said tubular shaft for maintaining the conductive support rods solidly fixed to said tubular shaft, whereby when the casing is rotated the resistive element will remain stationary and the spring contact will slide along the resistive element.

References Cited in the file of this patent

UNITED STATES PATENTS

| | | |
|---|---|---|
| 2,117,285 | Schellenger | Oct. 24, 1939 |
| 2,494,998 | Guller | Jan. 17, 1950 |

FOREIGN PATENTS

| | | |
|---|---|---|
| 210,944 | Great Britain | Feb. 14, 1924 |